United States Patent
Gustavsson

(10) Patent No.: US 9,689,454 B2
(45) Date of Patent: Jun. 27, 2017

(54) FREQUENCY TUNED DAMPER

(71) Applicant: TRELLEBORG AUTOMOTIVE FORSHEDA AB, Trelleborg (SE)

(72) Inventor: Bengt-Göran Gustavsson, Bredaryd (SE)

(73) Assignee: TRELLEBORG AUTOMOTIVE FORSHEDA AB, Trelleborg (SE)

( * ) Notice: Subject to any disclaimer, the term of this patent is extended or adjusted under 35 U.S.C. 154(b) by 0 days.

(21) Appl. No.: 14/398,639

(22) PCT Filed: May 6, 2013

(86) PCT No.: PCT/EP2013/059372
§ 371 (c)(1),
(2) Date: Nov. 3, 2014

(87) PCT Pub. No.: WO2013/167524
PCT Pub. Date: Nov. 14, 2013

(65) Prior Publication Data
US 2015/0107948 A1    Apr. 23, 2015

(30) Foreign Application Priority Data
May 9, 2012   (EP) ..................................... 12167348

(51) Int. Cl.
*F16F 7/108*    (2006.01)
*F16F 1/373*    (2006.01)

(52) U.S. Cl.
CPC ............ *F16F 7/108* (2013.01); *F16F 1/3732* (2013.01)

(58) Field of Classification Search
CPC .. F16F 7/108; F16F 1/36; F16F 1/3615; F16F 1/373; F16F 1/3732; F16F 2224/025; F16F 2230/0005; F16F 2234/04; F16F 2228/066

(Continued)

(56) References Cited

U.S. PATENT DOCUMENTS

| | | | | |
|---|---|---|---|---|
| 2,951,674 A | * | 9/1960 | Rice | ....................... F16F 1/3732 267/141.4 |
| 3,319,918 A | * | 5/1967 | Rapata | .................... B60R 11/00 267/141 |

(Continued)

FOREIGN PATENT DOCUMENTS

| | | |
|---|---|---|
| DE | 100 26 970 A1 | 12/2001 |
| EP | 1 303 710 B1 | 9/2004 |

(Continued)

*Primary Examiner* — Thomas J Williams
(74) *Attorney, Agent, or Firm* — Birch, Stewart, Kolasch & Birch, LLP

(57) ABSTRACT

The present disclosure relates to a frequency tuned damper with an elastic element (7) adapted to connect a vibration body (5) to a surface (3). The elastic element has a wide portion (17) and a narrow portion (19) disposed at different locations along a longitudinal axis (23) which is substantially parallel with the normal of the surface when the damper is mounted, and has a first circumferential mounting groove (11) in the wide portion (17), for attaching the wide portion to the surface, and a second circumferential mounting groove (15) in the narrow portion (19), for attaching the narrow portion to the vibration body. The first circumferential mounting groove extends along an elongated path. This provides a damper that is capable of providing two different resonance frequencies in two perpendicular directions in the plane of the surface, and can easily be aligned in a desired direction.

21 Claims, 3 Drawing Sheets

(58) Field of Classification Search
USPC ............... 267/136, 140.11, 140.13, 153, 292
See application file for complete search history.

(56) References Cited

U.S. PATENT DOCUMENTS

| | | | | |
|---|---|---|---|---|
| 4,442,367 | A | * | 4/1984 | Suzuki ................... F16F 1/373 |
| | | | | 248/632 |
| 4,895,354 | A | | 1/1990 | Byrnes |
| 5,046,566 | A | | 9/1991 | Dorner et al. |
| 5,699,865 | A | * | 12/1997 | Forderer ................ B25F 5/006 |
| | | | | 267/153 |
| 9,200,691 | B2 | | 12/2015 | Boes et al. |
| 2004/0040809 | A1 | * | 3/2004 | Gustavsson ........... F16F 1/3713 |
| | | | | 188/379 |
| 2008/0230968 | A1 | * | 9/2008 | Kubo .................... F16F 13/101 |
| | | | | 267/140.13 |
| 2010/0140855 | A1 | * | 6/2010 | Gustavsson ............ F16F 7/108 |
| | | | | 267/140.5 |
| 2015/0220105 | A1 | * | 8/2015 | Harimoto ................ G05G 5/03 |
| | | | | 267/153 |

FOREIGN PATENT DOCUMENTS

| | | | |
|---|---|---|---|
| FR | 2702696 A1 * | 9/1994 | ............ B24B 27/08 |
| VA | 10 2010 0465 118 A1 | 3/2012 | |
| WO | WO 2008/127157 A1 | 10/2008 | |

\* cited by examiner

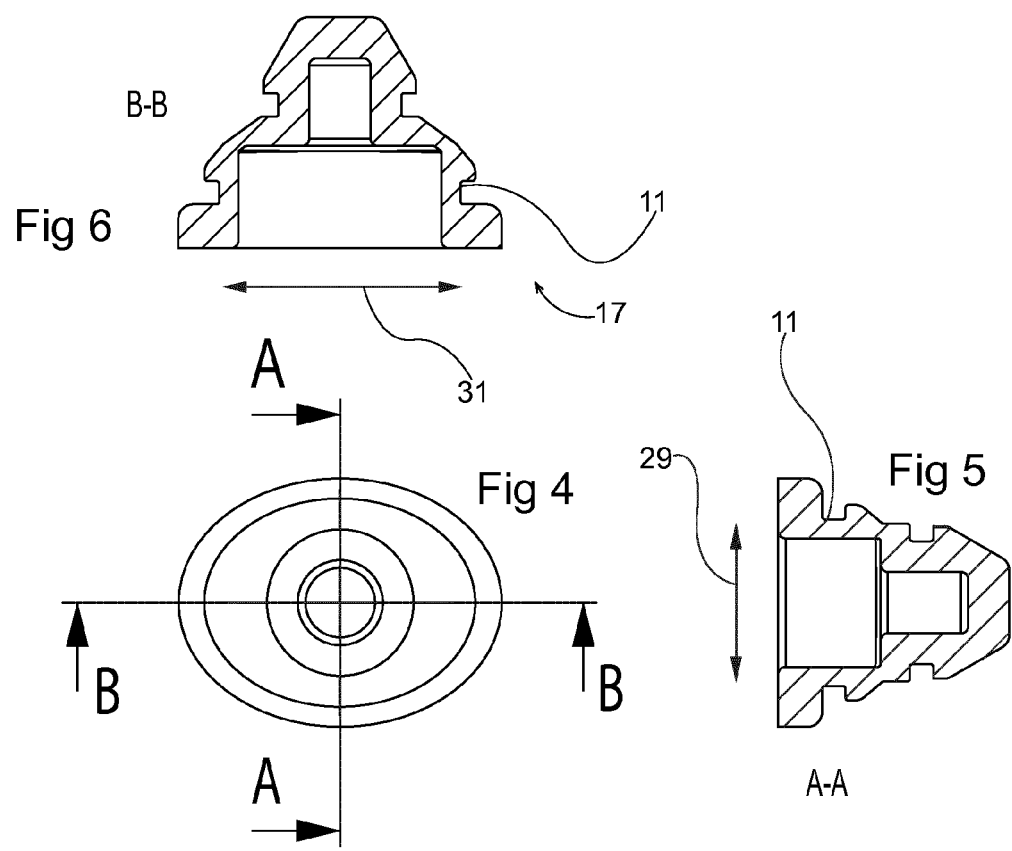
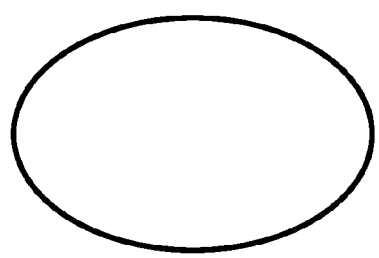
Fig 7
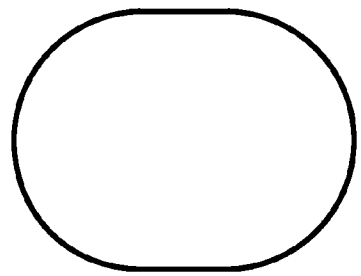
Fig 8
Fig 9

FREQUENCY TUNED DAMPER

TECHNICAL FIELD

The present disclosure relates to a frequency tuned damper that can be used, for instance, in a vehicle. The damper has a vibration body and at least one elastic element which is adapted to connect the vibration body to a surface, the vibrations of which is to be dampened. The elastic element has a wide portion and a narrow portion disposed at different locations along a longitudinal axis which may be substantially parallel with the normal of the surface when the damper is mounted. One of the portions is adapted to attach the elastic element to the vibration body and the other to attach the elastic element to the surface, and the wider portion has a cavity. The elastic element comprises a first circumferential mounting groove in the wide portion, for attaching the wide portion to one of the vibration body and the surface, and a second circumferential mounting groove in the narrow portion, for attaching the narrow portion to the other of the vibration body and the surface.

BACKGROUND

Such a damper is known e.g. from EP-1303710-A1 and WO-2008/127157-A1. While the latter document describes how different resonance frequencies can be dampened in different vibration directions, it is still a problem to achieve a more versatile damper that can be mounted in a reliable way.

SUMMARY

One object of the present disclosure is therefore to achieve a damper which is versatile and provides reliable mounting.

This object is achieved by means of a damper as defined in appended claim 1. More specifically, in a damper of the initially mentioned kind, the first circumferential mounting groove, the one associated with the wider elastic element portion, extends in a closed loop, parallel with the surface, and along an elongated path, such that the loop deviates from a circular shape. This has a double effect. As the groove path is elongated, the elastic element will exhibit different dynamic properties along and across the elongated axis. This means that the damper will be capable of damping vibrations with one frequency that influance the surface in a first direction, while damping vibrations with another frequency in that influence the surface in a second direction that is perpendicular with the first. At the same time, as the mounting groove extends in an elongated path, the elastic element will be correctly oriented in a reliable way.

The elongated path of the first mounting groove may thus be oval, and the second circumferential mounting groove may extend along a circular path. More specifically, the first circumferential mounting groove may be elliptic.

Typically, the second circumferential mounting groove may be attached to the vibration body.

A transition portion, defining a wall, may interconnect the wide and narrow portions of the elastic element, and the thickness of the wall may vary along the periphery of the element at a given location of the longitudinal axis. This serves to further vary the dynamic properties in different directions, and may be used also if the first circumferential mounting groove is circular.

BRIEF DESCRIPTION OF THE DRAWINGS

FIGS. 4-6 show a top view of an elastic element, and two cross sections therethrough.

FIGS. 7-9 illustrate different possible configurations of a mounting groove.

DETAILED DESCRIPTION

Figure 1:
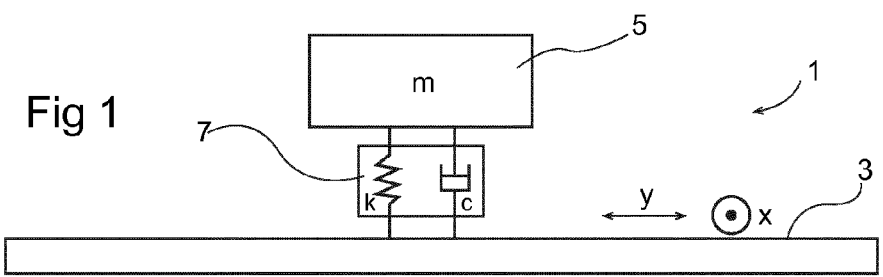
FIG. 1 illustrates schematically the basic principle of a frequency tuned damper.

The present invention relates in general to frequency tuned dampers. FIG. 1 illustrates the basic principle of a frequency tuned damper 1. A damper is used to dampen vibrations in a surface 3, and comprises a vibration body 5 and at least one elastic element 7, which are attached to the surface 3 and together provide a spring-mass system.

The mass m of the vibration body 5, and the stiffness k and damping c of the elastic element are selected to provide a damping effect on the surface, which can be expected to vibrate at a predetermined target frequency. When the surface 3 vibrates at this target frequency, the vibration body 5 is caused to oscillate/resonate at the same frequency as the surface, but out of phase with the surface, such that the vibration of the surface is substantially dampened. The vibration body may vibrate with an amplitude substantially greater than the vibration amplitude of the surface. The general concept of a frequency tuned damper is well known per se, see for instance EP-1303710-A1 and WO-2008/127157-A1.

The following disclosure presents an elastic element 7 for use in a frequency tuned damper, which is suitable for dealing with vibrations in two directions parallel with the vibrating surface 3, and where the vibrations in the directions, designated x (perpendicular to the plane of the paper in FIG. 1) and y have different target frequencies.

Figure 2:
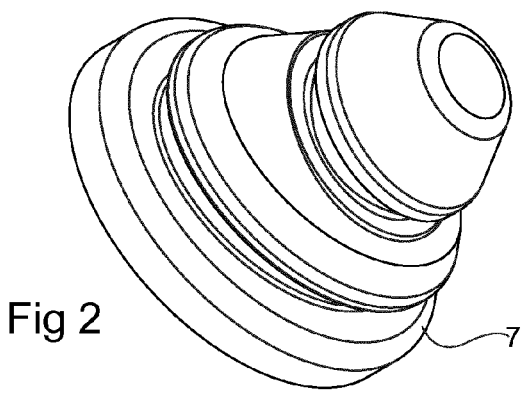
FIG. 2 shows, in a perspective view, an elastic element.

FIG. 2 shows, in a perspective view, an elastic element 7 according to the present disclosure. The elastic elements may be made of different elastic materials. Silicone rubber is one suitable example as a silicone rubber elastic element retains its stiffness and damping parameters to a great extent even if the temperature varies.

Figure 3:
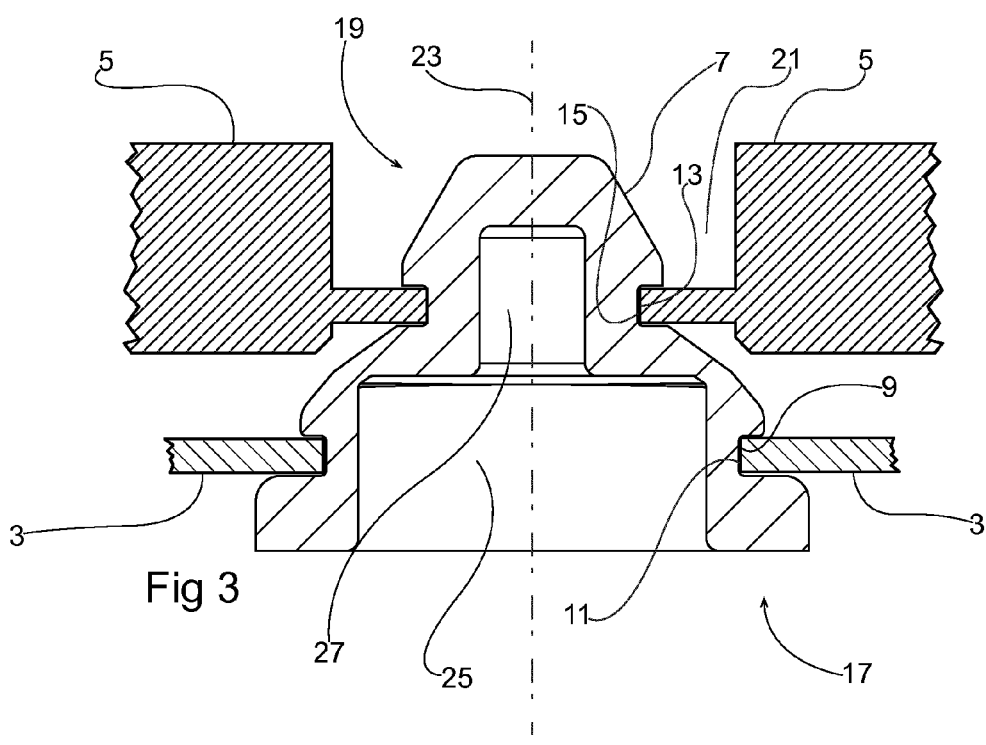
FIG. 3 shows, in cross section, the elastic element of FIG. 2 when attached to a vibrating surface and a vibration body.

FIG. 3 shows, in cross section, the elastic element 7 of FIG. 2 when attached to a vibrating surface 3 and a vibration body 5. The vibration body may be made of a material with relatively high density, such as cast iron or the like.

The vibrating surface 3 is not to be regarded as a part of the damper, as the purpose of the damper is to reduce vibrations in a surface already existing in a structure. However, the elastic elements may also be connected to the vibration surface via an intermediate member, which may then be regarded as a part of the damper. As will be shown, the surface also has an opening suitable for connecting to the elastic element.

In the illustrated example, the damper may be attached to the vibration surface 3 by pushing the elastic element 7 through a corresponding opening 9 in the surface 3 until a first mounting groove 11 in the elastic element 7 forms a grip on the rim of the opening 9.

A part of the elastic element is further pushed through a corresponding opening 13 into the interior of the vibration body 5 until a second groove 15 on the elastic element 7 forms a similar grip on the vibration body 5.

Typically, 3-5 elastic elements can be used to connect one vibration body 5 to the surface 3, the surface and the vibration body thus having a corresponding number of aligned openings 11, 13.

The elastic element will be described in greater detail below. Generally, as illustrated in FIG. 3, the elastic element 7 has a wide portion 17 and a narrow portion 19 (the wide portion being wide as compared to the narrow portion and vice-versa). The wide portion 17 is in the illustrated case attached to the vibration surface 3 by means of the circumferential mounting groove 11 in the wide portion engaging the rim 9 of the opening in the vibration surface 3. In a corresponding manner, the narrow portion 19 is attached to the vibration body 5 by means of the circumferential mounting groove 15 in the narrow portion engaging with an opening/circumferential projection 13, which projects from the wall of a cavity 21 in the vibration body 5. By means of this arrangement, the vibration body 5 is resiliently suspended in relation to the vibration surface 3. The wide and narrow portions 17, 19 are disposed at different locations along a longitudinal axis 23 which is substantially parallel with the normal of the surface 3. The cavity 21 in the vibration body 19 may be sufficiently large to allow a reasonably great vibration amplitude without coming in direct contact with the elastic element (thereby radically increasing the stiffness). However, it may be useful to let the wide portion come in contact with, and stop the movement of, the vibration body before the vibration body comes into contact with the vibration surface, as strong noise would otherwise be generated.

Alternatively, an arrangement is conceivable where the vibration body 5 is instead attached to the wide portion 17 of the elastic element 7, and the vibration surface 3 is attached to the narrow portion 19 of the elastic element.

The elastic element has a cavity 25, 27 which is open at the wide portion 17. The cavity may have a wider part 25 and a narrower part 27, and the latter may extend into the narrow part 19 of the elastic element. The cavity 25, 27 may be used, in a mounting procedure, to receive a tool (not shown) that is used to insert the elastic element 7 into the opening of the surface 3 and into the cavity of the vibration body 5.

In the present disclosure, the elastic element is adapted to provide different resonant frequencies in two different directions of the vibrating surface.

FIG. 4 shows a top view of an elastic element as seen from above the narrow element portion (cf. 19 in FIG. 3). FIG. 5 shows a first cross section A-A in FIG. 4, and FIG. 6 shows a second cross section B-B in FIG. 4. The cross sections are perpendicular to each other and are taken along the longitudinal axis (cf. 23 in FIG. 3) of the elastic element.

As can be seen in FIGS. 4-6, the circumferential mounting groove 11 in the wide portion 17 is elongated. This means that, while the mounting groove 11 extends in a closed loop which is parallell with the surface to which the element is mounted, that loop is stretched such that it deviates from a circular shape. The grooves width 29 in the cross section of FIG. 5 is therefore substantially smaller than the corresponding width 31 in FIG. 6.

This feature provides the advantage that, when the elastic element is fitted in an opening with a shape that corresponds to the mounting groove, the elastic element with automatically align itself in the desired direction and will provide one resonance frequency along the elongated axis of the groove path and another resonance frequency across this axis. The directions of those axes are predictably decided by how the corresponding elongated hole in the surface is orientated. In the example in FIGS. 4-6, a considerably higher resonance frequency will be provided parallel with the cross section B-B than parallel with the cross section A-A.

The second circumferential mounting groove 15 may suitably extend along a circular path, and can be fitted in a corresponding circular opening 13 in the vibration mass.

In FIGS. 4-6, the circumferential mounting groove has 11 approximately an elliptic shape deviating from the circular shape. Approximately elliptic may deviate somewhat from the strict mathematical definition of an ellipse, i.e. a closed plane curve which generated by a point moving in such a way that the sum of its distances to a first and a second fixed point is constant, and may still provide a good result. FIG. 7 shows such a shape. A circular shape is a special case of an elliptic shape where those fixed points coincide. In the elliptic shape is here the exclusion of that special case considered.

FIG. 8 shows another conceivable elongated, oval shape, i.e. two half circles connected by two straight lines. FIG. 9 shows a third possible shape, an elongated rectangle with rounded corners. In general, the circumferential groove forms a closed path that extends in a plane and has different extensions in two perpendicular directions in that plane, as illustrated in the example in FIGS. 5-6.

Figure 10:
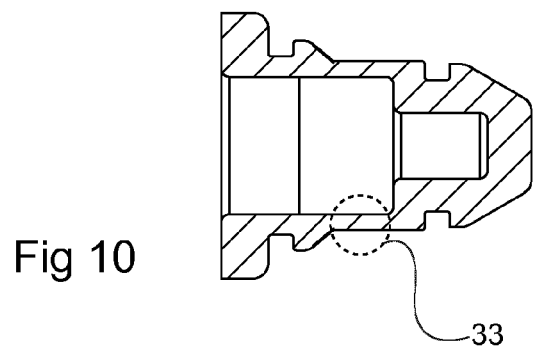
FIGS. 10 and 11 show cross sections corresponding to FIGS. 5-6 for an alternative embodiment of an elastic element.
Figure 11:
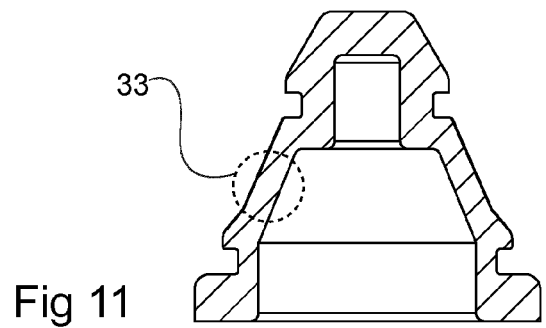

FIGS. 10 and 11 show cross sections corresponding to FIGS. 5-6 for an alternative embodiment of an elastic element. As compared to the embodiment in FIGS. 5 and 6, the elastic element in FIGS. 10 and 11 is taller and has a more pronounced transition portion 33. A can be seen in FIGS. 10 and 11, the elongated shape of the wider portion's mounting groove 11, the wall, between the cavity and the outer boundary of the element, appears cylindrical in FIG. 10 while it appears conical in FIG. 11. The wall in FIG. 10 could also appear conical with a different angle of inclination as compared with in FIG. 11.

As illustrated in FIGS. 10 and 11, the wall thickness at the transition portion 33 may vary along the circumferential periphery of the transition portion in a plane that is perpendicular to the longitudinal axis (cf. 23, FIG. 3). This serves to further adjust the resonating frequency. For instance, the thicker wall illustrated in FIG. 11 will provide a comparatively higher resonating frequency perpendicularly to the elongated axis of the elastic element and parallel with the cross section of FIG. 11. This feature also provides an effect in isolation. An elastic element, where the wall thickness in a transition portion varies along the periphery at a given location of the longitudinal axis 23, may thus exhibit different resonance frequencies in the aforementioned x- and y-directions, even if the first circumferential mounting groove is perfectly circular. Correct orientation of the elastic element around the longitudinal axis may then be accomplished by other means, if it is critical. For instance, by providing a dent in the groove, and a corresponding projection from the hole edge in the surface, an otherwise circular groove can be locked in a correctly oriented position.

The invention is not restricted to the described embodiments and may be altered in different ways within the scope of the appended claims.

The invention claimed is:

1. A frequency tuned damper being attached to a vibrating surface, vibrations of which are to be dampened and comprise different vibration frequencies in two different directions of the vibrating surface, said damper comprising:
   a vibration body; and
   at least one elastic element by which the vibration body is attached to the vibrating surface, wherein:
the elastic element has a wide portion and a narrow portion disposed at different locations along a longitudinal axis of the elastic element which is substantially parallel with the normal of the vibrating surface,
the elastic element is attached to the vibration body by one of said wide portion and said narrow portion and attached to the vibrating surface by the other one of said wide portion and said narrow portion,
the wide portion has a cavity,
the elastic element includes:
a first circumferential mounting groove in the wide portion attaching the wide portion to one of the vibration body and the vibrating surface, and
a second circumferential mounting groove in the narrow portion attaching the narrow portion to the other of the vibration body and the vibrating surface,
the first circumferential mounting groove extends in a closed loop in a plane parallel with the vibrating surface along an elongated path, such that the closed loop deviates from a circular shape and has different extensions in two perpendicular directions in said plane,
said elastic element has different resonant frequencies in said two perpendicular directions,
said first mounting groove is fitted in an opening having a shape that corresponds to the first mounting groove for correctly orienting the elastic element around said longitudinal axis, and
the elastic element further includes a transition portion defining a wall which interconnects the wide portion and the narrow portion of the elastic element, and the thickness of the wall of the transition portion varies along the circumferential periphery of the elastic element at a given location of the longitudinal axis for adjusting said resonant frequencies of the frequency tuned damper to said different vibration frequencies of the vibrating surface.

2. The frequency tuned damper according to claim 1, wherein said elongated path is oval.

3. The frequency tuned damper according to claim 2, wherein the first circumferential mounting groove is elliptic.

4. The frequency tuned damper according to claim 1, wherein the second circumferential mounting groove extends along a circular path.

5. The frequency tuned damper according to claim 4, wherein the first circumferential mounting groove is elliptic.

6. The frequency tuned damper according to claim 1, wherein the second circumferential mounting groove is attached to the vibration body.

7. A frequency tuned damper being attached to a vibrating surface, vibrations of which are to be dampened and comprise different vibration frequencies in two different directions of the vibrating surface, said damper comprising:
a vibration body; and
at least one elastic element by which the vibration body is attached to the vibrating surface, the vibrations of which are to be dampened and comprise different vibration frequencies in two different directions of the vibrating surface,
wherein:
the elastic element has a wide portion and a narrow portion disposed at different locations along a longitudinal axis of the elastic element which is substantially parallel with the normal of the vibrating surface,
the elastic element is attached to the vibration body by one of said wide portion and said narrow portion and attached to the vibrating surface by the other one of said wide portion and said narrow portion, and
the elastic element includes:
a first circumferential mounting groove in the wide portion attaching the wide portion to one of the vibration body and the vibrating surface,
a second circumferential mounting groove in the narrow portion attaching the narrow portion to the other of the vibration body and the vibrating surface, and
a transition portion defining a wall which interconnects the wide portion and narrow portion of the elastic element, the thickness of the transition portion wall varies along the circumferential periphery of the elastic element at a given location of the longitudinal axis for providing the elastic element with different resonant frequencies in two perpendicular directions in a plane parallel with the vibrating surface, said resonant frequencies being tuned to said different vibration frequencies of the vibrating surface.

8. The frequency tuned damper according to claim 7, wherein an angle of inclination of said wall of the transition portion in relation to said longitudinal axis of the elastic element varies along the circumferential periphery of the elastic element at a given location of the longitudinal axis for adjusting said resonant frequencies of the frequency tuned damper to said different vibration frequencies of the vibrating surface.

9. The frequency tuned damper according to claim 8, wherein the wall of the transition portion has an inner surface, the inner surface defining the angle of inclination of the transition portion.

10. The frequency tuned damper according to claim 7, wherein the transition portion has a non-circular or elliptical shape in cross-section.

11. The frequency tuned damper according to claim 7, wherein the elastic element has a cavity extending from the wide portion into the transition portion.

12. The frequency tuned damper according to claim 11, where a cross-section of the cavity located in the transition portion is elliptical.

13. A frequency tuned damper being attached to a vibrating surface, vibrations of which are to be dampened and comprise different vibration frequencies in two different directions of the vibrating surface, said damper comprising:
a vibration body; and
at least one elastic element by which the vibration body is attached to the vibrating surface,
wherein:
the elastic element has a wide portion and a narrow portion disposed at different locations along a longitudinal axis of the elastic element which is substantially parallel with the normal of the vibrating surface,
the elastic element is attached to the vibration body by one of said wide portion and said narrow portion and attached to the vibrating surface by the other one of said wide portion and said narrow portion,
the wide portion has a cavity,
the elastic element includes:
a first circumferential mounting groove in the wide portion attaching the wide portion to one of the vibration body and the vibrating surface, and
a second circumferential mounting groove in the narrow portion attaching the narrow portion to the other of the vibration body and the vibrating surface,
the first circumferential mounting groove extends in a closed loop in a plane parallel with the vibrating surface along an elongated path, such that the closed loop deviates from a circular shape and has different extensions in two perpendicular directions in said plane, said elastic element has different resonant frequencies in said two perpendicular directions, said first mounting groove is fitted in an opening having a shape that corresponds to the first mounting groove for correctly orienting the elastic element around said longitudinal axis, the elastic element further includes a transition portion defining a wall which interconnects the wide portion and the narrow portion of the elastic element, and said wall of the transition portion has a different angle of inclination in relation to said longitudinal axis of the elastic element when viewed along said two perpendicular directions for adjusting said resonant frequencies of the frequency tuned damper to said different vibration frequencies of the vibrating surface.

14. A frequency tuned damper being attached to a vibrating surface, vibrations of which are to be dampened and comprise different vibration frequencies in two different directions of the vibrating surface, said damper comprising:

a vibration body; and at least one elastic element by which the vibration body is attached to the vibrating surface, the vibrations of which are to be dampened and comprises different vibration frequencies in two different directions of the vibrating surface, wherein:

the elastic element has a wide portion and a narrow portion disposed at different locations along a longitudinal axis of the elastic element which is substantially parallel with the normal of the surface, the elastic element is attached to the vibration body by one of said wide portion and said narrow portion and attached to the vibrating surface by the other one of said wide portion and said narrow portion, and the elastic element includes:

a first circumferential mounting groove in the wide portion attaching the wide portion to one of the vibration body and the vibrating surface, a second circumferential mounting groove in the narrow portion attaching the narrow portion to the other of the vibration body and the vibrating surface, and a transition portion defining a wall which interconnects the wide portion and the narrow portion of the elastic element, wherein an angle of inclination of the transition portion wall in relation to said longitudinal axis of the elastic element varies along the circumferential periphery of the elastic element at a given location of the longitudinal axis between a first angle of inclination and a different second angle of inclination for providing the elastic element with different resonant frequencies in two perpendicular directions in a plane parallel with the vibrating surface, said resonant frequencies being tuned to said different vibration frequencies of the vibrating surface.

15. The frequency tuned damper according to claim 14, wherein said first angle of inclination is non-zero and said second angle of inclination is essentially zero.

16. The frequency tuned damper according to claim 14, wherein said elastic element further includes a frusto-conical portion located between the first circumferential mounting groove and the transition portion wall, said frusto-conical portion presenting a circumferential frusto-conical surface having a non-varying angle of inclination in relation to the longitudinal axis of the elastic element.

17. The frequency tuned damper according to claim 14, wherein:

the thickness of the transition portion wall varies along the circumferential periphery of the elastic element at a given location of the longitudinal axis for adjusting said resonant frequencies of the frequency tuned damper to said different vibration frequencies of the vibrating surface.

18. The frequency tuned damper according to claim 14, wherein the wall of the transition portion has an inner surface, the inner surface defining the angle of inclination of the transition portion.

19. The frequency tuned damper according to claim 14, wherein the transition portion has a non-circular or elliptical shape in cross-section.

20. The frequency tuned damper according to claim 14, wherein the elastic element has a cavity extending from the wide portion into the transition portion.

21. The frequency tuned damper according to claim 20, where a cross-section of the cavity located in the transition portion is elliptical.

* * * * *